United States Patent Office 3,493,521
Patented Feb. 3, 1970

3,493,521
PROCESS FOR PREPARING POLYETHERS
CONTAINING ALDEHYDE GROUPS
Ludwig Brinkmann, Frankfurt am Main, and Siegfried Noetzel, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Mar. 22, 1966, Ser. No. 536,260
Claims priority, application Germany, Apr. 3, 1965, F 45,723
Int. Cl. C08g 23/14
U.S. Cl. 260—2    7 Claims

ABSTRACT OF THE DISCLOSURE

A process for preparing polyether polymers having reactive aldehyde groups and the products thus prepared are disclosed. The polymers may be prepared by polymerizing epoxy acetals of the formula

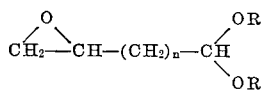

wherein $n$ is 0 to 10 and R is a saturated aliphatic radical of 1 to 5 carbon atoms, either alone or with other vicinal epoxides free from acetal groups, and then hydrolyzing the acetal groups of the resulting polymer to aldehyde groups. Anionic catalysts such as compounds of metals of Groups II, III, VII and VIII of the Periodic Table may be used. The polymerization can be carried out in bulk, solution or dispersion at temperatures of $-90°$ to $120°$ C. The polymers can be used for the manufacture of films, fibers and other shaped structures and can be crossed-linked with bifunctional compounds which react with aldehyde groups, e.g., hydrazines.

---

The present invention relates to polyethers containing aldehyde groups and to a process for preparing them.

It is known that polyethers can be prepared by polymerizing epoxides in the presence of cationic or anionic catalysts. According to the state of the art it has not been possible so far to prepare polyethers carrying aldehyde groups statistically distributed over the macromolecule because the appropriate starting compositions and the catalysts mutually react with one another and thus inhibit polymerization.

It has now been found that polyethers containing aldehyde groups can advantageously be prepared by polymerizing epoxides of the general formula

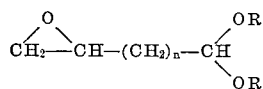

in which $n$ means zero or an integer in the range of from 1 to 10 and R stands for an aliphatic radical having 1 to 5 carbon atoms, if desired with one or several epoxides that do not contain acetal groups, in the presence of anionic catalysts, and hydrolyzing the polymer obtained in known manner.

Suitable monomers are, for example 2,3-oxido-propionaldehyde-diethyl acetal, 3,4-oxido-butyraldehyde-diethyl acetal and 10,11-oxido-undecanal-diethyl acetal.

As copolymerizable epoxides that are free from acetal groups there may be used saturated alkylene oxides, for example ethylene oxide, propylene oxide, 1,2- and 2,3-butylene oxide; substituted alkylene oxides, for example epichlorohydrin, epibromohydrin, methylallyl chloride epoxide, 1,1,1-trichloro-2,3-epoxypropane, styrene oxide, α-methylstyrene oxide; cycloaliphatic epoxides, for example cyclopentene oxide, cyclohexene oxide, cycloheptene oxide; epoxy ethers, for example methylglycidyl ether, phenylglycidyl ether, chloro-, nitro-, and alkyl-phenyglycidyl ethers, chloroalkylglycidyl ethers; and unsaturated alkylene oxides, for example butadiene-monoepoxide, isoprene-monoepoxide, 1,2-epoxypentene-(4), 1,2 - epoxyhexene - (5), allylglycidyl ether, ortho-allylphenylglycidyl ether, 1,2-epoxy-4-vinyl-cyclohexane, 1,2-epoxy-cyclooctene-(5). The aforesaid compounds can be used in an amount of 95 to 50% by weight, calculated on the monomer mixture.

The polymerization can be carried out, for example, in bulk, in dispersion or in solution. Solid, tough or rubber-like polyethers are obtained depending on the types of the epoxide containing acetal groups and the epoxide free from acetal groups and on their proportions used.

The polymerization is performed in the presence of anionic catalysts. Suitable catalysts are, for example, alkali metals, alkali metal hydroxides, oxides and hydrated oxides of the elements of Groups II and III of the Periodic Table, for example aluminum, zinc, magnesium, or calcium, their hydrocarbon compounds, alcoholates, halogenated derivatives, hydrides and complex compounds with amides and other nitrogen-containing compounds, metal chelates, carbonates, sulfates, and fatty acid salts; furthermore compounds of the metals of Groups VII and VIII of the Periodic Table, for example hydroxides, halogenated derivatives, sulfates or organic derivatives such as alkyloxides and aryloxides. Especially suitable are organo-metal compounds of aluminum and zinc, which may have been reacted also with dialkyl ethers, chelate-forming agents, for example 1,3-diketones, as well as with alcohols, amines and water. The best results are obtained with aluminum trialkyls, dialkyl aluminium monohydrides and dialkyl aluminum monoalkyl oxides. Active catalysts are obtained, for example, by using 0.5 mole of water and of acetylacetone, respectively, as chelate forming agents for one mole of the organo-metal compound. The catalysts are used in an amount of from 0.1 to 10 mole percent, calculated on the amount of monomers to be polymerized.

Suitable solvents to be used for the polymerization in solution are, for example, aromatic hydrocarbons such as benzene, toluene, iso-propylbenzene, chlorobenzene; aliphatic hydrocarbons such as butane, hexane, heptane, and petroleum fractions that have been freed from oxygen, sulfur and unsaturated compounds; cycloaliphatic compounds such as cyclohexane and methylcyclohexane; chlorinated hydrocarbons such as carbon tetrachloride; dialkyl ethers such as diethyl ether, dibutyl ether and ethylene glycol dimethyl ether; and cyclic ethers such as tetrahydrofurane.

The process can be carried out either continuously or discontinuously. When the polymerization is performed in solution the ratio of the amount of monomer to the amount of solvent can be varied within wide limits. It is appropriate to operate with concentrations in the range of from 1 to 30 grams of monomer for 100 milliliters of solvent. The polymerization can be carried out at a temperature in the range of from $-90$ to $120°$ C., preferably 0 to $100°$ C. When the polymers are obtained in solution it may be expedient to subject the polymerization mixture to a distillation with steam to separate the polymers obtained, whereupon they are washer and dried.

The polyethers containing acetal groups are subjected to hydrolysis. The polymers are hydrolized in the dissolved or strongly swollen state in aromatic hydrocarbons such as benzene or ortho-dichlorobenzene under the action of aqueous mineral acids at a temperature in the range of from 50 to $150°$ C. and for 15 to 60 minutes.

The polyethers containing aldehyde groups according to the invention can be used in various fields of application. They can be used, for example, for the manufacture of films, fibers and other shaped structures. Still further, they can be reacted with hydroxyl amine or phenyl hydrazine and used for disproportioning reactions to give polyethers containing carboxyl groups and hydroxyl groups. When they are reacted with bifunctional compounds which react with aldehyde groups, for example hydrazines, cross-linked, insoluble products are obtained.

The following examples serve to illustrate the invention but they are not intended to limit it thereto.

Example 1

19.2 milliliters of a catalyst system consisting of a solution of 12.5% strength by weight of aluminum triethyl in a mixture of diethyl ether and heptane (proportion by volume 2:1), 0.5 mole of water and 0.5 mole of acetylacetone for each mole of aluminum triethyl were added in a nitrogen atmosphere to 400 milliliters of dried heptane. After heating to 50° C. a mixture of 36 grams of propylene ovide and 4 grams of 2,3-oxide-propion-aldehyde-diethyl acetal (boiling point 64° C. under 13 mm. of mercury) was added over a period of 30 minutes while stirring and the whole was polymerized for 6 hours at 50° C. The catalyst was then inactivated by adding 25 milliliters of methanol, the polymer was isolated by distillation with steam and dried at 50° C. under reduced pressure. 34 grams (85% of the theory) of benzene-soluble polymer were obtained having a reduced viscosity of 10.6 (with a 0.1% solution in benzene at 25° C.).

By boiling for 1 hour a 4% solution of the polymer in benzene in the presence of methanolic hydrochloric acid of 9% strength the polymer could be transformed into a polyether containing aldhyde groups and having a reduced viscosity of 0.48 (with a 0.1% solution in benzene at 25° C.).

Example 2

12.8 milliliters of the catalyst specified in Example 1 were added under nitrogen to 400 milliliters of hexane, the whole was heated at 50° C. and a mixture of 36 grams of propylene oxide and 4 grams of 3,4-oxido-butyraldehyde-diethyl acetal (boiling point 89.5° C. under 20 mm. of mercury) was added in portions over a period of 30 minutes while stirring. After polymerizing for 6 hours at 50° C., 25 milliliters of methanol were added to inactivate the catalyst and the solid polymer was isolated by distillation with steam in a yield of 79%. It had a reduced viscosity of 11.9 (with a 0.1% solution in benzene at 25° C.).

By heating a benzenic solution of the polymer of 4% strength in the presence of methanolic hydrochloric acid a polyether containing aldehyde groups was obtained having a reduced viscosity of 0.5 (with a 0.1% solution in benzene at 25° C.).

Example 3

30 milliliters of the catalyst specified in Example 1 were added to 300 milliliters of hexane and at 50° C. a mixture of 36 grams of phenylglycidyl ether and 4 grams of 2,3-oxido-propion-aldehyde-diethyl acetal was added in portions over a period of 30 minutes. After polymerizing for 5 hours at 50° C., 30 milliliters of methanol were added and the solid polymer was isolated by distillation with steam. After drying for several hours at 50° C. under reduced pressure and in a nitrogen atmosphere, 28 grams of solid polymer were obtained having a reduced viscosity of 3.9 (with a 0.1% solution in orthodichlorobenzene at 135° C.).

By heating a 2% polymer solution in ortho-dichlorobenzene with an excess of methanolic hydrochloric acid a polyether containing aldehyde groups was obtained having a reduced viscosity of 0.4 (with a 0.1% solution in ortho-dichlorobenzene at 135° C.).

Example 4

30 milliliters of the catalyst specified in Example 1 were added to a mixture of 36 grams of phenylglycidyl ether and 4 grams of 3,4-oxido-butyraldehyde-diethyl acetal in 300 milliliters of hexane and the mixture was polymerized for 5 hours at 50° C. 30 milliliters of methanol were then added and the solid polymer was isolated by distillation with steam. 86% of dried material were obtained having a reduced viscosity in ortho-dichlorobenzene of 4.2 (0.1% 135° C.).

The polymer containing acetal groups was transformed into a polyether containing aldehyde groups by boiling for 1 hour a 2% solution of the polymer in ortho-dichlorobenzene in the presence of methanolic hydrochloric acid. The polyether had a reduced viscosity of 0.1 (0.1% solution in ortho-dichlorobenzene at 135° C.).

Example 5

30 milliliters of the catalyst specified in Example 1 were added to a mixture of 36 grams of epichlorohydrin and 4 grams of 3,4-oxido-butyraldehyde-diethyl acetal in 400 milliliters of toluene and the whole was polymerized for 5 hours at 50° C. The polymerization mixture was then stirred with 30 milliliters of methanol and subjected to a distillation with steam. 75% of a rubber-like polymer were obtained having a reduced viscosity of 5.4 (with a 0.1% solution in ortho-dichlorobenzene at 135° C.).

By heating at 100 to 130° C. the polymer containing acetal groups for 1 hour in ortho-dichlorobenzene in the presence of methanolic hydrochloric acid a polyether containing aldehyde groups was obtained having a reduced viscosity of 0.2 (with a 0.1% solution in ortho-dichlorobenzene at 135° C.).

Example 6

A mixture of 18 grams of phenylglycidyl ether, 9 grams of ethylene oxide and 3 grams of 3,4-oxidobutyraldehyde-diethyl acetal in 300 milliliters of absolute toluene was polymerized for 5 hours at 50° C. using 30 milliliters of the catalyst specified in Example 1. The polymerization mixture was then stirred with 30 milliliters of methanol at room temperature and evaporated to dryness at 50° C. and under reduced pressure. 27.5 grams of a rubber-like polymer were obtained having a reduced viscosity of 3.9 (with a 0.1% solution in ortho-dichlorobenzene at 135° C.).

6 grams of the terpolymer containing acetal groups were heated for 30 minutes at 80° C. in 200 milliliters of benzene in the presence of 40 milliliters of methanolic hydrochloric acid (3 parts by volume of methanol, 1 part by volume of concentrated hydrochloric acid). The solid hydrolysis product was separated from the liquid phase by filtration, washed with aqueous ammonia of 5% strength and with water until the wash water was neutral and dried under reduced pressure at 50° C. in a nitrogen atmosphere. The product containing aldehyde groups had a reduced viscosity of 0.5 (with a 0.1% solution in orthodichlorobenzene at 135° C.).

Example 7

A mixture of 18 grams of epichlorohydrin, 9 grams of ethylene oxide and 3 grams of 3,4-oxido-butyraldehyde-diethyl acetal in 300 milliliters of absolute toluene was polymerized for 5 hours at 50° C. using 30 milliliters of the catalyst specified in Example 1. The mixture was stirred with 30 milliliters of methanol to interrupt the polymerization and evaporated to dryness at 50° C. and under reduced pressure. 21.2 grams of a rubber-like polymer were obtained having a reduced viscosity of 2.4 (with a 0.1% solution in ortho-dichlorobenzene at 135° C.).

By heating at 80° C. a dilute solution of the polymer containing acetal groups in benzene for 30 minutes with methanolic hydrochloric acid a polyether containing aldehyde groups was obtained having a reduced viscosity of 0.5 (with a 0.1% solution in ortho-dichlorobenzene at 135° C.).

What is claimed is:

1. A process for preparing polyethers containing aldehyde groups, which comprises polymerizing monomeric vicinal epoxides containing acetal groups of the general formula

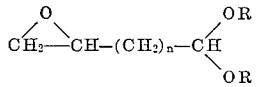

in which $n$ is zero to 10 and R is a saturated aliphatic radical having 1 to 4 carbon atoms in the presence of an anionic catalyst and hydrolyzing the polymer obtained to convert acetal groups thereof to aldehyde groups.

2. A process for preparing polyethers containing aldehyde groups, which comprises polymerizing monomeric vicinal epoxides containing acetal groups of the general formula

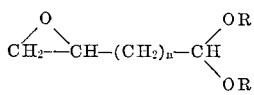

in which $n$ is zero to 10 and R is a saturated aliphatic radical having 1 to 5 carbon atoms, together with one or more vicinal epoxides that do not contain acetal groups, in the presence of an anionic catalyst and hydrolyzing the polymer obtained to convert acetal groups thereof to aldehyde groups.

3. The process of claim 1, wherein 2,3-oxido-propionaldehyde-diethyl acetal, 3,4-oxido-butyraldehyde-diethyl acetal or 10,11-oxidoundecanal-diethyl acetal is used as epoxide containing acetal groups.

4. The process of claim 2, wherein ethylene oxide, propylene oxide, 1,2- and 2,3-butylene oxide, epichlorohydrin, epibromohydrin, methylallyl chloride epoxide, 1,1,1-trichloro-2,3-epoxypropane, styrene oxide, α-methyl-styrene oxide, cyclopentene oxide, cyclohexene oxide, cycloheptene oxide, methyl-glycidyl ether, phenylglycidyl ether, butadiene monoepoxide, isoprene monoepoxide, 1,2-epoxypentene-(4), 1,2-epoxyhexene-(5), allyl glycidyl ether, orthoallyl-phenylglycidyl ether, 1,2-epoxy-4-vinylcyclohexane and 1,2-epoxy-cyclooctene-(5) are used as epoxides that do not contain acetal groups.

5. The process of claim 2, wherein 95 to 50% by weight of epoxides that do not contain acetal groups are used.

6. A process for preparing polyethers containing aldehyde groups, which comprises homopolymerizing a monomeric vicinal epoxide containing an acetal group of the general formula

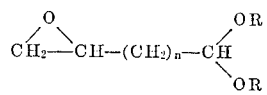

in which $n$ is 1 to 10 and R is a saturated aliphatic radical having 1 to 4 carbon atoms in the presence of an anionic catalyst and hydrolyzing the polymer obtained to convert acetal groups thereof to aldehyde groups.

7. A polyether containing aldehyde groups made by the process of claim 6.

References Cited
UNITED STATES PATENTS

| | | |
|---|---|---|
| 2,887,498 | 5/1959 | Hearne et al. |
| 3,091,631 | 5/1963 | Isler et al. _____ 260—602 |
| 3,158,590 | 11/1964 | Phillips et al. |
| 3,067,175 | 12/1962 | Sullivan et al. |

WILLIAM H. SHORT, Primary Examiner

T. PERTILLA, Assistant Examiner

U.S. Cl. X.R.

260—47, 88.3